United States Patent
Benner et al.

(10) Patent No.: US 8,179,125 B2
(45) Date of Patent: May 15, 2012

(54) MAGNETIC PASSIVE POSITION SENSOR

(75) Inventors: Hans-Guenter Benner, Kriftel (DE); Bernd Pauer, Eppstein (DE)

(73) Assignee: Continental Automotive GmbH, Hannover (DE)

( * ) Notice: Subject to any disclaimer, the term of this patent is extended or adjusted under 35 U.S.C. 154(b) by 261 days.

(21) Appl. No.: 12/676,554

(22) PCT Filed: Jan. 20, 2009

(86) PCT No.: PCT/EP2009/050605
§ 371 (c)(1), (2), (4) Date: Mar. 4, 2010

(87) PCT Pub. No.: WO2009/106381
PCT Pub. Date: Sep. 3, 2009

(65) Prior Publication Data
US 2010/0207610 A1    Aug. 19, 2010

(30) Foreign Application Priority Data
Feb. 28, 2008 (DE) .................. 10 2008 011 713

(51) Int. Cl.
*G01B 7/14* (2006.01)
*G01B 7/30* (2006.01)
(52) U.S. Cl. .............. 324/207.13; 324/207.25
(58) Field of Classification Search ............ 324/207.13, 324/207.25
See application file for complete search history.

(56) References Cited

U.S. PATENT DOCUMENTS

| | | | |
|---|---|---|---|
| 5,442,865 | A | 8/1995 | Wallrafen |
| 5,798,640 | A | 8/1998 | Gier et al. |
| 6,127,916 | A | 10/2000 | Cooper et al. |
| 2004/0130319 | A1 | 7/2004 | Eck et al. |
| 2007/0152658 | A1 | 7/2007 | Pauer |

FOREIGN PATENT DOCUMENTS

| | | |
|---|---|---|
| DE | 19526254 | 1/1997 |
| DE | 29700870 | 3/1997 |
| DE | 19821529 | 2/2000 |
| DE | 10 2004 039 853 A1 | 3/2006 |
| SU | 903776 A1 | 2/1982 |
| SU | 1127898 A1 | 12/1984 |

*Primary Examiner* — Bot Ledynh
(74) *Attorney, Agent, or Firm* — Cozen O'Connor

(57) ABSTRACT

A magnetic passive position sensor including a base plate and a cover which form a housing, a magnet that can be moved outside the housing, a resistance network that has several individual electric contacts, and a plurality of contact spring elements that are arranged within the range of motion of the magnet, are interconnected by a common base, and consist of a bending zone and a contact zone. The contact spring elements face the contacts of the resistance network in such a way that the contact zones can be moved from the magnets against the contacts of the resistance network, the contact zones of at least two contact spring elements being assigned to each individual contact of the resistance network. Two adjoining contact spring elements are mechanically interconnected.

11 Claims, 2 Drawing Sheets

MAGNETIC PASSIVE POSITION SENSOR

PRIORITY CLAIM

This is a U.S. national stage of application No. PCT/EP2009/050605, filed on Jan. 20, 2009, which claims Priority to the German Application No: 10 2008 011 713.7, filed: Feb. 28, 2008; the contents of both which are incorporated here by reference.

BACKGROUND OF THE INVENTION

1. Field of the Invention

The subject matter of the invention is a passive magnetic position sensor with a base plate and a cover that form a housing, a magnet capable of being moved outside the housing, a resistance network arranged within the housing having a plurality of individual electrical contacts, with a large number of contact spring elements arranged in the movement range of the magnet connected to one another via a common basic body and each comprising a bending region and a contact region. The contact spring elements are positioned opposite the contacts of the resistance network such that the contact regions are capable of being moved by the magnet against the contacts of the resistance network, the contact regions of at least two contact spring elements being assigned to each individual contact of the resistance network.

2. Prior Art

A position sensor is known from DE 10 2004 004 102 B3 that is used in level measuring devices in fuel tanks in motor vehicles. The position sensor generates electrical signals depending on a position of the magnet. The provision of at least two tongues, which are positioned opposite each individual contact of the resistance network is intended to ensure that, in the event of contaminating particles adhering, at least one of the two tongues produces a connection with the contact. Owing to magnetic influences on the position sensor, transverse forces may arise which have an effect on the contact spring elements. This may result in a lateral shift in the individual tongues of the contact spring elements, with the result that at an individual contact, three tongues or only one tongue enters into a connection with the respective contact. In cases in which only one tongue enters into a connection with a contact, there is no longer provision for redundancy. In order to avoid any possible failures or faulty indications during use, the position sensors are tested correspondingly and faulty position sensors are removed.

SUMMARY OF THE INVENTION

The invention is based on providing a magnetic passive position sensor which has the provision for redundancy in the event of the tongues making contact with the respective contact of the resistance network, independently of destructive magnetic influences, by virtue of at least two tongues being in connection with in each case one contact given a corresponding position of the magnet.

According to one embodiment of the invention two adjacent contact spring elements are connected to one another mechanically. With the arrangement of a connection between two adjacent contact spring elements, the ability of each contact spring element to move freely in the plane in which they are arranged is severely restricted. This restriction of the movability is so severe that transverse forces which have occurred no longer result in the contact spring elements in the plane being deflected. The movability of the contact spring elements in the direction of the contacts of the resistance network and therefore perpendicular to the plane of their arrangement is still attained without any alteration.

In a simple configuration, two contact spring elements that are assigned to a contact, are connected to one another mechanically. The advantage of this configuration is that the connection between two contact spring elements results in a coupling that is effectively perpendicular to the plane in which the contact spring elements are arranged. As soon as a contact spring element is deflected in the direction of the contact of the resistance network by the magnetic field of the magnet, a slight deflection of the second coupled contact spring element takes place by virtue of the connection, although this is not yet subject to the influence of the magnetic field of this order of magnitude.

In another configuration, the coupling of two adjacent contact spring elements takes place such that the connection is arranged between two contact spring elements, each of which is assigned to one contact.

In order not to couple the ability of an individual contact spring element to bend too strongly to the adjacent contact spring element as a result of the connection thereto, it has proven to be advantageous for the contact spring elements to be connected to one another in their bending regions.

The movability of the contact spring elements in the direction of the contacts of the resistance network, substantially perpendicular to the plane in which they are arranged, is only slightly influenced if the distance of the connection between two contact spring elements from the basic body is smaller than half the length of the bending region of a contact spring element.

In accordance with one embodiment of the invention, the contact spring elements are coupled to one another strongly if the connection between two contact spring elements is arranged in the contact region.

Sufficient strength of the connection between two contact spring elements is provided if the width of the connection is at least as great as the width of the bending region.

The connection can be realized in a variety of ways. It can be produced in a simple manner if it is formed as a separate part, preferably as a web, which is connected to the contact spring elements. In other configurations the connection may be a force-fitting connection and/or a form-fitting connection. by virtue of the contact spring elements being connected by bonding, soldering, flange-connecting or hooking into latching points provided on the web.

Separate production of the connection with subsequent fitting is avoided in one embodiment of the invention by the connection between two contact spring elements being connected integrally to said contact spring elements. This type of connection has the advantage that the connections between two contact spring elements are produced at the same time as the production of the contact spring elements, with the result that no further working step is required. The production of the contact spring elements and the connections can preferably take place by etching, stamping or laser cutting.

In accordance with one embodiment of the invention, the avoidance of a deflect by transverse forces in addition to the connection can be assisted by the fact that, in their bending regions, the contact spring elements have a structure, preferably an L profile or a U profile, which counteracts such a deflection. Such a profile in the being regions of the contact spring elements can be produced in a simple manner by a reforming step which directly follows the production of the contact spring elements. It is furthermore conceivable to dispense with the connection between in each case two contact spring elements if the structure of the bending regions has sufficient resistance to transverse forces.

BRIEF DESCRIPTION OF DRAWINGS

The invention will be explained in more detail with reference to the exemplary embodiments. In the figures.

DETAILED DESCRIPTION OF THE DRAWINGS

Figure 1:
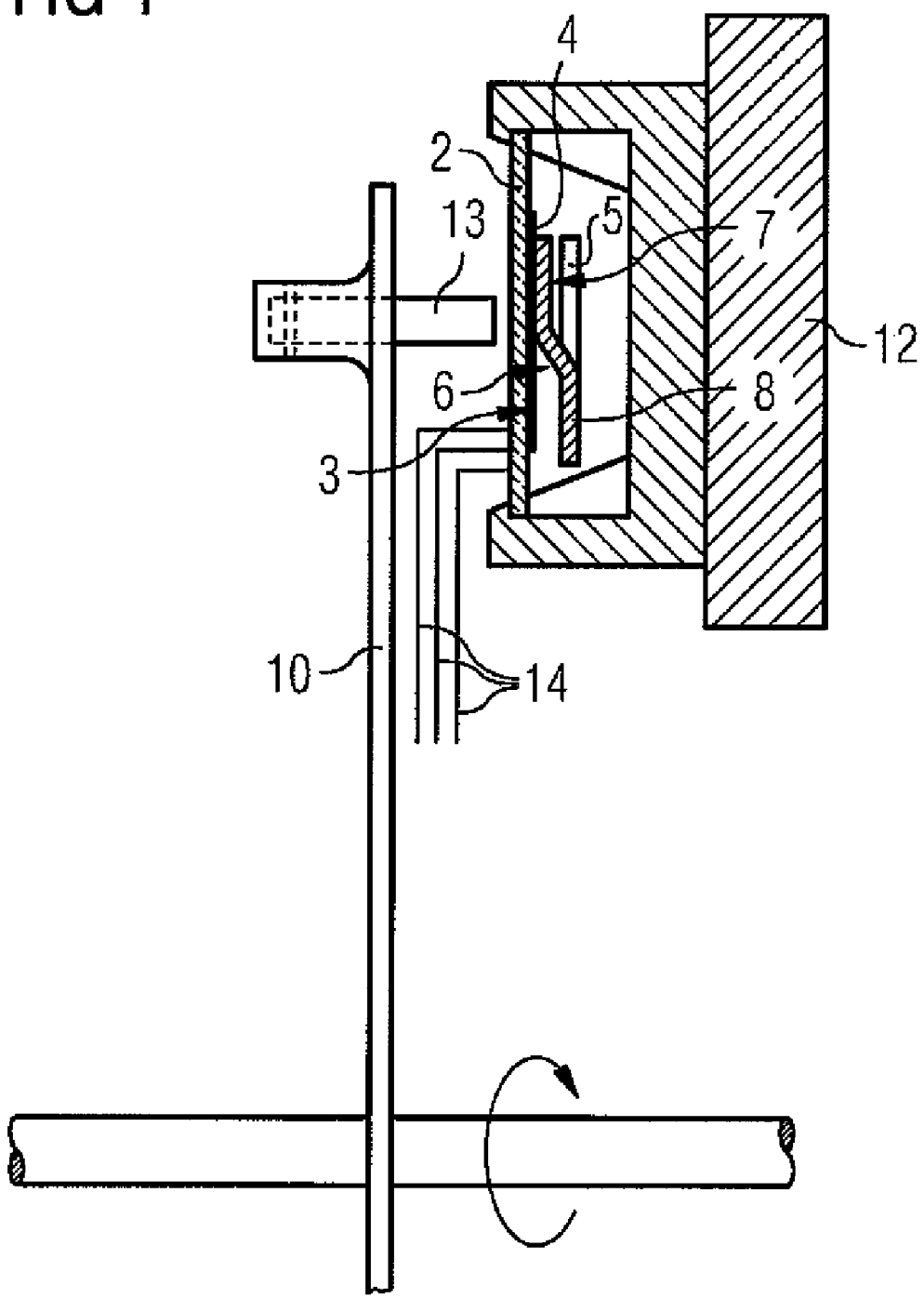
FIG. 1 is a magnetic passive position sensor.

The magnetic passive position sensor 1 in FIG. 1 comprises a nonconductive base plate 2, preferably made from ceramic. A resistance network 3 is applied to the base plate 2 using thick-film technology with a plurality of individual electrical contacts 4. Contact spring elements 5, which have a bending region 6 and a contact region 7, are arranged opposite the contacts 4. The contact spring elements 5 are connected to one another by a common basic body 8. The resistance network 3 is sealed off from the surrounding environment by a metallic cover 9, which is preferably soldered to the base plate 2. A lever arm 10 of a fill level sensor is arranged opposite that side of the base plate 2 which is remote from the cover 9, the fill level sensor being arranged in the interior of a fuel tank 12. A magnet 13 is fastened on the lever arm 10 in such a way that it brushes over the region of the contacts 4 when the lever arm 10 is pivoted, as a result of which the contact spring elements 5 are moved against the contacts 4, and thus an electrical signal is generated depending on the pivoting angle of the lever arm 10, said signal being supplied via electrical lines 14 from the fuel tank 12 to an evaluation unit.

Figure 2:
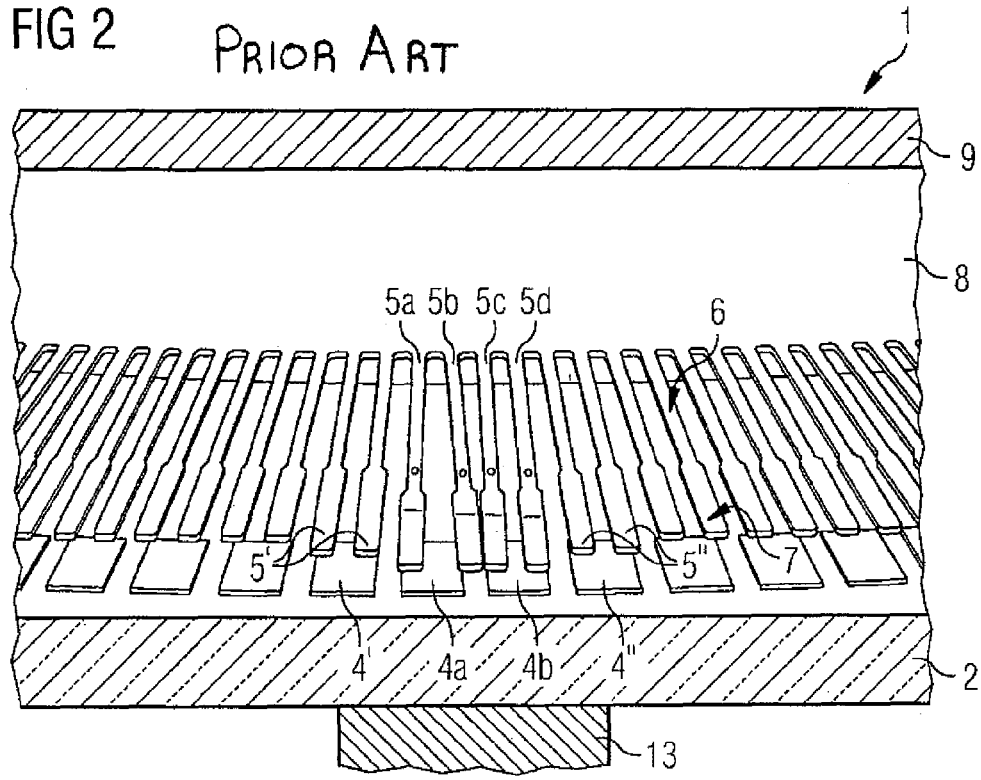
FIG. 2 are prior art contact spring elements of the magnetic passive position sensor shown in FIG. 1.

FIG. 2 is a considerably enlarged perspective view of the position sensor 1. On the base plate 2, only the contacts 4 of the resistance network are shown for reasons of better illustration. The contact spring elements 5 with the basic body 8 are arranged over the contacts 4. The bending region 6 is provided with a narrower configuration that the contact region 7 for reasons of better deflection. To provide redundancy, two contact spring elements 5 are preferably provided opposite a contact 4. The magnet 13 is arranged below the base plate 2. The contact spring elements 5a-d are attracted towards the contacts 4a, 4b by the magnetic field. The respectively adjacent contact spring elements 5', 5" are only deflected slightly as a result of the magnetic field which has a weaker effect in these regions, without coming into contact with the contacts 4', 4". Owing to transverse forces, the contact spring elements 5b is deflected in the direction of the contact 4b.

Figure 3:
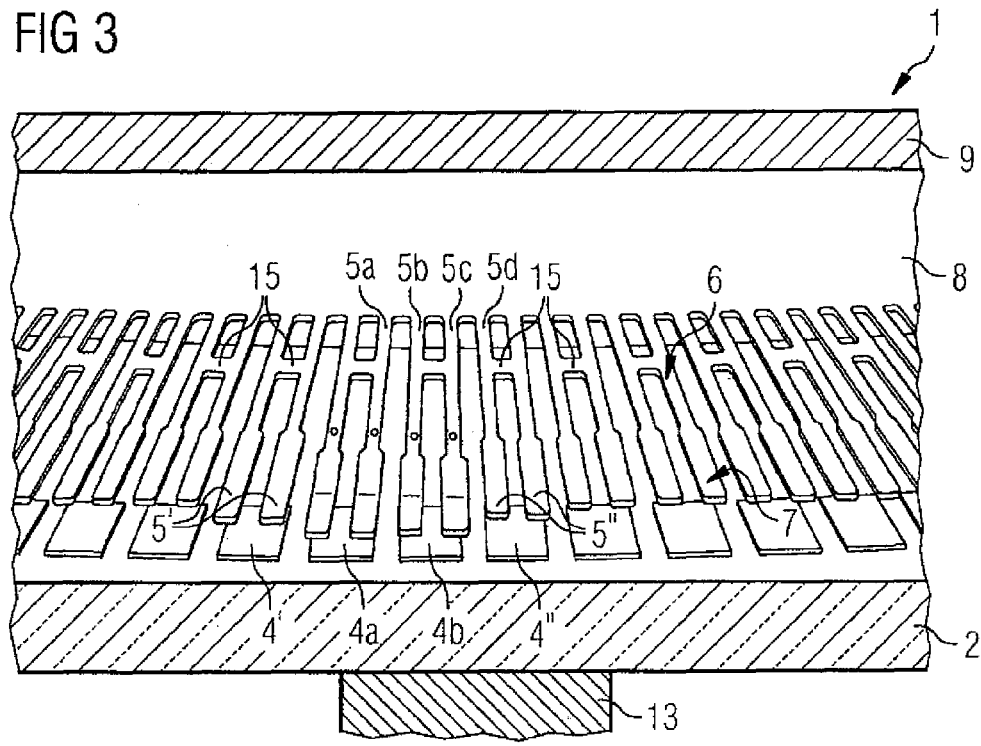
FIG. 3 are contact spring elements of a magnetic passive position sensor according to the invention.

FIG. 3 illustrates the position sensor according to one embodiment of the invention in a perspective view as shown in FIG. 2. The position sensor differs by virtue of the contact spring elements 5. In each case two contact spring elements 5 are connected to one another mechanically by a web 15 in their bending regions 6. The web 15, like the basic body 8, is integrally connected to the contact spring elements. If transverse forces occur, as described in FIG. 2, the web 15 prevents the contact spring elements 5 from being deflected laterally in an undesirable manner. The contact spring elements 5 therefore only come into connection with the contact 4 opposite them, despite any transverse forces which may be present.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A passive magnetic position sensor comprising:
a base plate;
a cover configured to mate with the base plate to form a housing;
a magnet arranged outside the housing and configured to be moved along the outside of the housing;
a resistance network arranged within the housing comprising a plurality of individual electrical contacts, the plural individual electrical contacts arranged along a movement range of the magnet;
a plurality of contact spring elements arranged along the movement range of the magnet, the plural contact spring elements connected to one another via a common base body at a first end of the contact spring elements, each of the plural contact spring elements further comprise:
a bending region;
a contact region arranged at a second end of the each of the plural contact spring elements; and
a connecting region configured to connect two adjacent contact spring elements in an area between the first end and the second end of the respective two adjacent contact spring elements,
wherein the respective contact regions are positioned opposite the individual electrical contacts of the resistance network such that the contact regions are configured to be moved by the magnet against the individual electrical contacts of the resistance network, the contact regions of at least two contact spring elements being assigned to each individual contact of the resistance network.

2. The passive magnetic position sensor as claimed in claim 1, wherein two respective contact spring elements assigned to a corresponding individual electrical contact of the resistance network are mechanically connected in the connecting region.

3. The magnetic passive position sensor as claimed in claim 1, wherein two adjacent contact spring elements are assigned to each respective individual electrical contact of the resistance network and are mechanically connected in the connecting region.

4. The passive magnetic position sensor as claimed in claim 1, wherein the connecting region is arranged in the bending region.

5. The passive magnetic position sensor as claimed in claim 4, wherein a length of at least one of the plural contact spring elements from the base body to the connection region is smaller than half a length of the bending region of the at least one plural contact spring elements.

6. The passive magnetic position sensor as claimed in claim 5, wherein a width of the connection region is at least a same width as a width of the bending region.

7. The passive magnetic position sensor as claimed in claim 1, wherein the connection region is a separate part, connected to two respective ones of the plural contact spring elements.

8. The passive magnetic position sensor as claimed in claim 1, wherein the connection region between two respective ones of the plural contact spring elements is integrally connected to the two respective ones of the plural contact spring elements.

9. The passive magnetic position sensor as claimed in claim 3, wherein the connection region is a separate part, connected to two respective ones of the plural contact spring elements.

10. The passive magnetic position sensor as claimed in claim 3, wherein the connection region between two respective ones of the plural contact spring elements is integrally connected to the two respective ones of the plural contact spring elements.

11. The passive magnetic position sensor as claimed in claim 1, wherein the plurality of contact spring elements comprise pairs of adjacent contact spring elements, each of the pairs of adjacent contact spring elements being connected by the connecting region, and each of the pairs of adjacent contact spring elements assigned to a respective one of the individual electric contacts.

* * * * *